United States Patent
Hubel et al.

(10) Patent No.: US 6,930,703 B1
(45) Date of Patent: Aug. 16, 2005

(54) METHOD AND APPARATUS FOR AUTOMATICALLY CAPTURING A PLURALITY OF IMAGES DURING A PAN

(75) Inventors: Paul M. Hubel, Mt View, CA (US); K Douglas Gennetten, Ft Collins, CO (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 0 days.

(21) Appl. No.: 09/562,597

(22) Filed: Apr. 29, 2000

(51) Int. Cl.⁷ .......................... H04N 7/00; H04N 5/228
(52) U.S. Cl. ................... 348/37; 348/208.16
(58) Field of Search ................ 348/39, 207, 37, 348/36, 94, 144, 208.1, 208.2, 208.3, 208.4, 208.13, 208.16, 220.16, 220.1, 239, 352, 367, 442, 451, 513, 137, 169, 216, 183, 184

(56) References Cited

U.S. PATENT DOCUMENTS

| | | | | |
|---|---|---|---|---|
| 5,103,254 A | * | 4/1992 | Bell et al. .................... | 396/147 |
| 5,138,460 A | | 8/1992 | Egawa | |
| 5,453,784 A | | 9/1995 | Krishnan et al. ........... | 348/348 |
| 5,510,830 A | * | 4/1996 | Ohia et al. .................... | 348/36 |
| 5,644,139 A | | 7/1997 | Allen et al. .................. | 250/557 |
| 5,808,678 A | | 9/1998 | Sakaegi ...................... | 348/334 |
| 5,838,368 A | * | 11/1998 | Masunaga et al. ....... | 348/211.9 |
| 5,878,283 A | | 3/1999 | House et al. ................... | 396/6 |
| 6,014,167 A | | 1/2000 | Suito et al. .................. | 348/169 |
| 6,075,905 A | * | 6/2000 | Herman et al. ............. | 382/284 |
| 6,304,284 B1 | * | 10/2001 | Dunton et al. ................ | 348/36 |
| 6,389,179 B1 | * | 5/2002 | Katayama et al. .......... | 382/284 |
| 6,456,323 B1 | * | 9/2002 | Mancuso et al. ........ | 348/218.1 |
| 6,466,262 B1 | | 10/2002 | Miyatake et al. | |
| 6,552,744 B2 | * | 4/2003 | Chen ....................... | 348/218.1 |

OTHER PUBLICATIONS

U.S. Appl. No. 09/430,613, filed Oct. 29, 1999, titled "Method And Apparatus For Intelligent Exposure Trigger", Inventors: Robert Cazier and David K. Campbell.

* cited by examiner

Primary Examiner—Wendy R. Garber
Assistant Examiner—Timothy J. Henn
(74) Attorney, Agent, or Firm—T. Grant Ritz

(57) ABSTRACT

A camera for automatically triggering a plurality of exposures during a pan based on a measure of camera displacement. During a pan, the camera regularly acquires images to compare a recently acquired image to a reference image. If the recently acquired image is optimally overlapped with the reference image, an exposure is triggered. In a digital camera, the images may be acquired with the native imager. In a film-based camera, or as an alternative embodiment for the digital camera, a sensor may be used to measure displacement. A series of images comprising a pan may be stored in the camera, or alternatively, each subsequent image may be stitched to a previous image to create a single panoramic image.

31 Claims, 10 Drawing Sheets

METHOD AND APPARATUS FOR AUTOMATICALLY CAPTURING A PLURALITY OF IMAGES DURING A PAN

CROSS-REFERENCE TO RELATED APPLICATION(S)

This application is related to U.S. patent application Ser. No. 09/561,761, entitled "METHOD AND APPARATUS FOR PROVIDING VISUAL FEEDBACK OF SCENE CAPTURE PROGRESS DURING A MULTI-FRAME PANNING OPERATION," filed concurrently herewith and hereby incorporated by reference.

BACKGROUND OF THE INVENTION

1. Field of the Invention

This invention relates generally to an automatic exposure release for a camera and, more particularly, to a method and apparatus for automatically capturing a plurality of images during a pan to create a panoramic image.

2. Description or Related Art

Panoramic photography dates back to the 1840's. The first panoramas, taken in the 1840s, were made by taking a series of daguerreotype images that could then be framed or hung side-by-side. The same approach was later used with tintypes and paper prints. By the late twentieth century, motorized cameras were being made specifically for panoramic photography. In one type, the lens swung while the film remained stationary. In another type, the camera rotated on a special tripod to "paint" the image on a moving sheet of film. One of the most famous of such cameras, the Kodak Cirkut camera was patented in 1904. It used large format film, ranging in width from 5" to 16" could produce 360-degree photographs measuring up to 20 feet long.

Today, there are a number of specialized panoramic cameras that create panoramas for both prints and on-screen use. However, the cost of these specialized cameras is generally prohibitively expensive for most consumers. Additionally, the irregularly large size of the negatives produced by these specialized panoramic cameras require special film developing services which are both rare and expensive.

Specialized panoramic cameras are not the only way to produce panoramas. The development of computer imaging software has enabled normal cameras to be used to create panoramic photographs. A conventional film or digital camera can be used to create a seamless panorama by carefully capturing a series of images (i.e., frames) around a single point of rotation, the optical center of the lens. After the series of frames are captured, the frames must then be digitized if they weren't taken with a digital camera. Once in digital format, the frames can be stitched together into a seamless view with special imaging software, such as Rounabout Logic's Nodestar, VideoBrush's Photographer, or Live Picture's Photo Vista.

As the frames are captured with a conventional or digital camera, the camera is panned a certain amount such that there is enough of a previous frame overlapping the current frame so that the software can subsequently match features in the two consecutive frames and register the scenes together. Tripod systems are available to aid in panning. Some tripods come with degree marks to guide the camera, or detents to secure the camera in place. The number of frames required is dependent upon the focal length, angle of view of the camera, and the camera's orientation (horizontal or vertical). Oftentimes calculations are required to assure that the appropriate number of frames are taken. Thus, capturing multiple frames that can be successfully stitched together requires a certain degree of understanding in addition to specialized equipment.

Finally, certain digital cameras also include a selectable "panoramic mode." However, this mode just captures a band across the middle of a conventionally sized image, leaving unexposed bands at the top and bottom of the image area. In effect, this is no different than just cropping an image after it is taken.

These are significant obstacles to making panoramic photography more accessible and reliable. Therefore, a simpler, automated approach is desirable to make panoramic photography available to most consumers without special cameras, equipment or development processing.

SUMMARY OF THE INVENTION

According to a preferred embodiment, the invention provides a method and apparatus for automatically capturing a plurality of images during a pan.

The invention may be viewed as a method for automatically triggering exposures during a pan. The method may be broadly conceptualized by the following operations: capturing a first scene portion at a first position; panning the camera across a scene; tracking movement of the camera with respect to the first position as the camera is panned; and capturing a second scene portion when the second scene portion sufficiently overlaps the first scene portion as defined by a predetermined overlap range.

The tracking operation may include periodically capturing current frames during the pan; and comparing each current frame to the first scene portion to determine overlap. The comparing may be performed using a correlation algorithm. The tracking operation may also include reading positional information from a motion sensor fixed to the camera.

In accordance with another feature of the invention, the second scene portion may be captured automatically if the camera shutter speed exceeds a predetermined threshold. The second scene portion may also be captured manually if the shutter speed is lower than a predetermined threshold. An audio/visual indication may be provided to prompt a camera operator to stop the pan and manually capture the second scene portion if the shutter speed is lower than a predetermined threshold.

In accordance with another feature of the invention, the method may include stitching together the first and second scene portions to create a panoramic image.

The invention may also be viewed as a camera for capturing a plurality of images during a pan of a scene. The camera may broadly be viewed as including an imager and a processor. The processor may be configured to capture a first scene portion with the imager; capture frames with the imager as the camera is panned; compare each frame to the first scene portion to determine an overlap; and capture a second scene portion when the second scene portion sufficiently overlaps the first scene portion as defined by a predetermined overlap range. The processor may use a correlation algorithm to determine the overlap.

The invention may also be viewed as a camera for capturing a plurality of images during a pan of a scene. The camera may broadly be viewed as including a motion sensor and a processor. The processor may be configured to capture a first scene portion; track motion with the motion sensor as the camera is panned to determine an overlap between the first scene portion and a second scene portion; and capture the second scene portion if the second scene portion sufficiently overlaps the first scene portion as defined by a predetermined overlap range. The motion sensor may include a gyroscope or a compass.

Other features and advantages of the invention will become apparent to one of ordinary skill in the art upon examination of the following detailed description of illustrative embodiments in conjunction with the accompanying drawings. It is intended that all such features and advantages be included herein within the scope of the invention and protected by the claims.

BRIEF DESCRIPTION OF THE DRAWINGS

The foregoing and other aspects, features, and advantages of the present invention will become apparent from the following detailed description, taken in conjunction with the accompanying drawings, illustration by way of example the principles of the invention.

DETAILED DESCRIPTION

Figure 1:
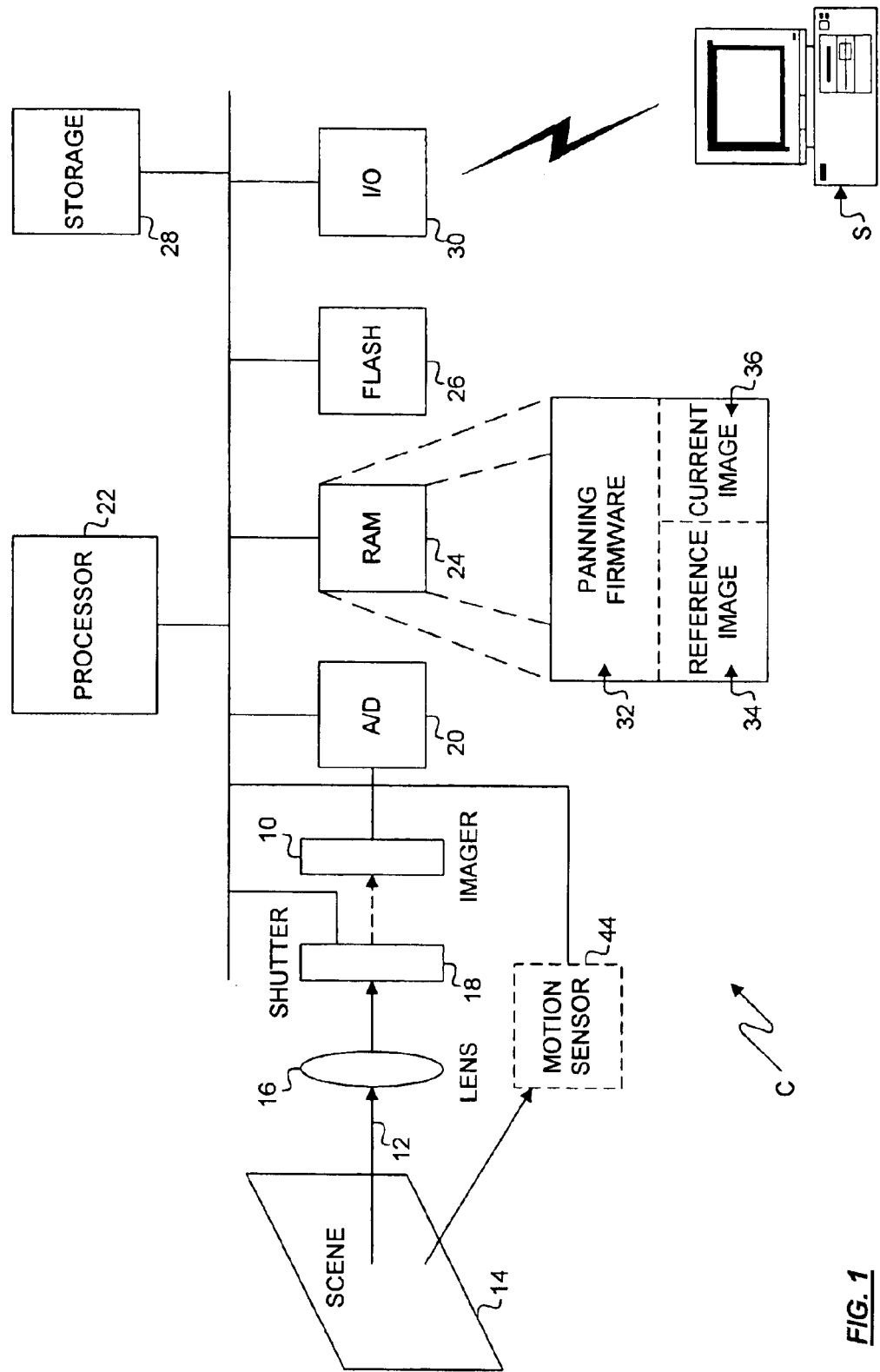
FIG. 1 is a block diagram illustrating a camera C according to a first embodiment.

As shown in the drawings for purposes of illustration, the invention is embodied in a camera that automatically and optimally triggers exposures during a pan of a scene. The triggering mechanism is preferably optimized to minimize overlap between adjacent frames and maximize storage capacity. Unlike prior art triggering methods, no auxiliary mechanisms such as special tripods, lenses or film are required. The triggering mechanism is fully contained within the camera for simplicity, convenience, and automation.

Referring first to FIG. 1, there is illustrated a block diagram of a camera C according to a first embodiment. The invention is embodied in a digital camera having a single processor capable of performing conventional camera operations as well as performing image analysis for purposes of automatically triggering exposures during a pan.

In contrast to traditional film-based cameras, digital cameras use a solid-state device called an image sensor 10. The image sensor 10 is a fingernail-sized silicon chip containing hundreds of thousands or millions of photosensitive elements in an array. The image sensor 10 is an active-pixel CMOS (complementary metal-oxide semiconductor) type sensor, however, alternative sensors may be used such as, passive-pixel CMOS and charge-coupled device (CCD) sensors.

In likeness to a traditional camera, light 12 reflected from a scene 14 enters the camera C through a lens 16 controlled by a shutter 18. The lens 16 focuses the scene 14 on the image sensor 10 and can be any type of lens designed to work with the camera C such as, normal, wide-angle, zoom, telephoto, etc. In contrast to a traditional camera, the shutter 18 may be built into the image sensor 10 in the form of a timing circuit (not shown) that causes the image sensor to start and stop collecting light. Alternative shutters, which are not built into the image sensor 10 can be used such as, electromechanical and electro-optical shutters. When the shutter 18 opens, light 12 is collected on the image sensor 10 and the photosensitive elements record intensities of red, green and blue light. Each photosensitive element converts the light falling on it into an electrical charge.

When the shutter 18 closes, the image sensor 10 "remembers" the pattern it recorded. The charges stored on the image sensor 10 are typically read out one row at a time. Signals representing each element intensity or charge are fed to an amplifier (not shown) and then converted to a digital number by an analog-to-digital converter (A/D) 20.

A processor 22 causes the digital data to be read from the A/D converter 20 and written to a random access memory (RAM) 24, such as dynamic or static RAM. A direct memory access (DMA) operation may move the data or the processor 22 can perform the move. The collection of digital numbers or data acquired in the RAM 24 comprise an image or photograph. The RAM 24, temporarily holds the image while the processor 22 optimizes the image for sharpness, lighting, etc.

The processor 22 is also coupled to a program memory (e.g. FLASH) 26, a storage unit 28, and an input-output (I/O) unit 30. The program memory 22 holds programming and initialization firmware for the processor 22 to execute in the performance of its tasks. The processor 22 preferably includes mathematics functionality for performing various image processing tasks, such as enhancing the digital images, performing color transformations, compressing the image into a smaller file size, and comparing images. The firmware may be moved to the RAM 24 for better performance.

The storage unit 28 is a persistent memory for storing images (i.e. photographs) that have been acquired. The storage unit 28 may be comprised of silicon storage, such as erasable programmable memory (e.g. EPROM, FLASH EPROM, EEPROM); magnetic storage, such as hard or floppy disk drives; optical storage; or photographic film (in the case of film-based cameras). Other read/write or write-once type memory technologies may be used for the storage unit 28.

The input/output unit 30 preferably includes circuitry to download images from the camera C to a remote storage or viewing device, such as a computer system S, printer, television, or other image storage device. The input/output unit 30 preferably includes an universal serial bus (USB) communications link, but other wired or wireless communication links such as a IrDA (infrared data association), RS232 serial link, RF (radio-frequency) (e.g., Bluetooth), IEEE-1394 "firewire" bus, or S-video communications link could be used. In the case of a film-based camera, no input/output unit is required.

In the operation of this embodiment, a pan image capture routine 32 is executed by the processor 22 to automatically trigger exposures during a pan based on a comparison between a previously stored exposure (i.e., reference image 34) and a recently acquired frame (i.e., current image 36).

Generally, when the processor 22 detects displacement or motion, within certain parameters, an exposure is triggered. Therefore, as the camera C is panned across the scene 14, a series of images is captured. The series of appropriately triggered digital images may be stitched together to form a single composite panoramic or wide-area image. Stitching may be performed onboard by the camera C or externally by the computer system S.

As will also become apparent from the following description to those of ordinary skill in the art, many types of functionally equivalent structure can carry out the functions identified in the blocks above. For example, processor 22, memory 26 and random access memory 24 may be replaced with a digital signal processor. In another architectural variation, the digital camera could include two processors: one dedicated to handling conventional camera operations and another dedicated to handling image analysis. In other variations, the image processing can be performed by a separate programmable math component, a special image processing circuit or a pixel co-processor either alone or in conjunction with one or more of the above functions. Also, the functions may be separated or combined into different structures without departing from the scope of the invention.

Figure 2:
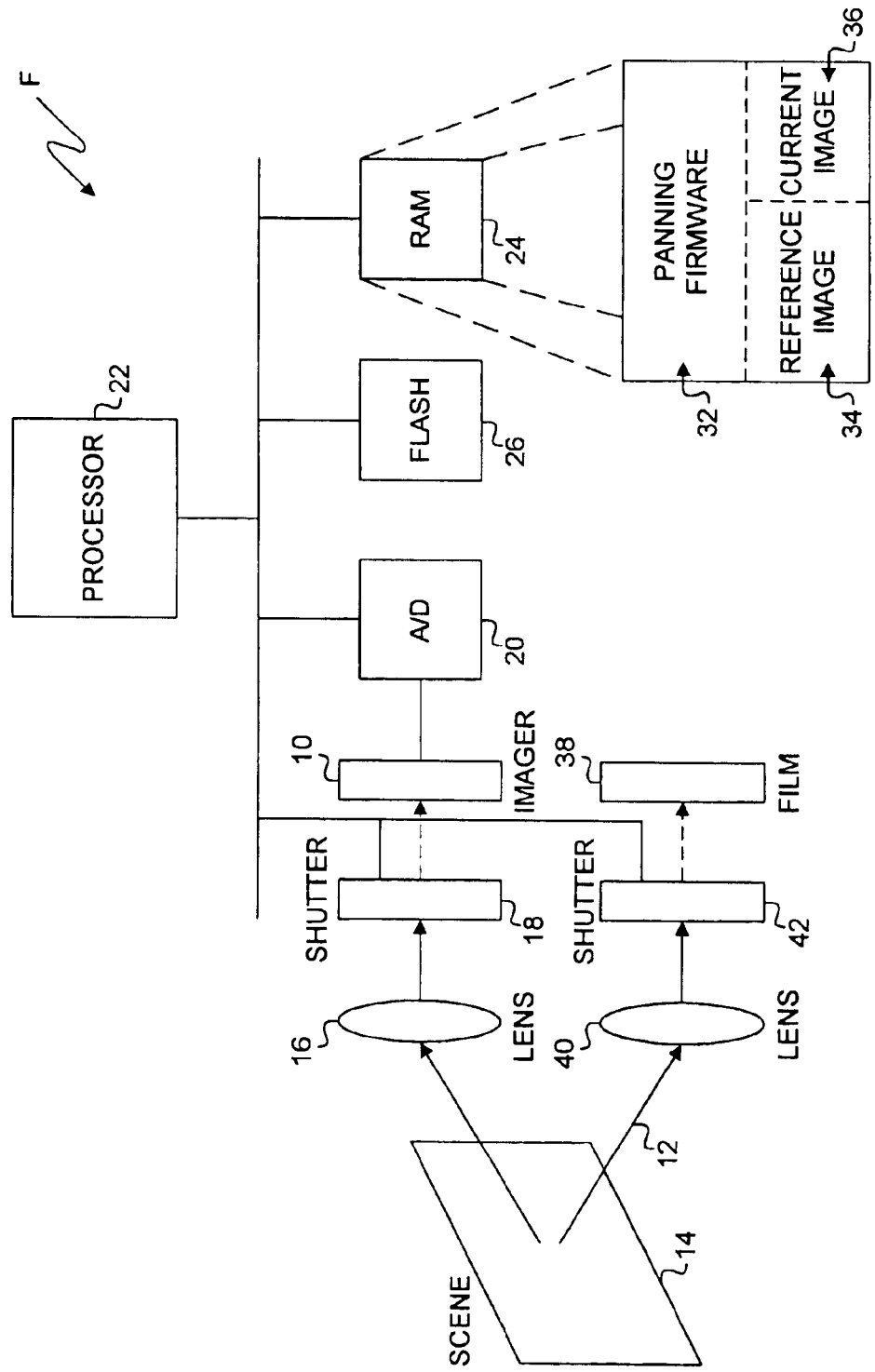
FIG. 2 is a block diagram illustrating a camera F according to a second embodiment.

Now referring to FIG. 2, there is illustrated a camera F according to a second embodiment of the present invention. It is noted that the components repeated from FIG. 1 are substantially identical and no further explanation is needed except as provided below. The first alternative embodiment relates to a film-based camera F having digital image processing capabilities to automatically trigger exposures during a pan.

In contrast to the digital cameras, the film-based camera F uses conventional silver halide-based film 38 to capture exposures. Light 12 reflected from the scene 14 enters the camera F through a lens 40 controlled by an electromechanical shutter 42. The shutter 42 is electronically triggered as a result of the pan image capture routine 32 executed by the processor 22.

As described in FIG. 1, the pan image capture routine 32 is responsive to digital images acquired via the imager 10. However, in this embodiment the acquired digital images are preferably not stored in a persistent memory, but instead used only to detect displacement or motion for purposes of triggering the shutter 42. The pan image capture routine 32 performs a digital comparison in memory 24 between a previously acquired exposure (i.e., reference digital image 34) and a recently acquired frame (i.e., current digital image 36). When displacement or motion is detected, the shutter 42 is trigged thereby causing an exposure on film 38.

Therefore, as the camera F is panned across the scene 14, a series of exposures are triggered. After the series of photographs are shot, the exposed film 38 must then be digitized with a scanner. Once in digital format, the photographs can be stitched together into a seamless panoramic or wide-area view with special imaging software on the computer system S.

Figure 3:
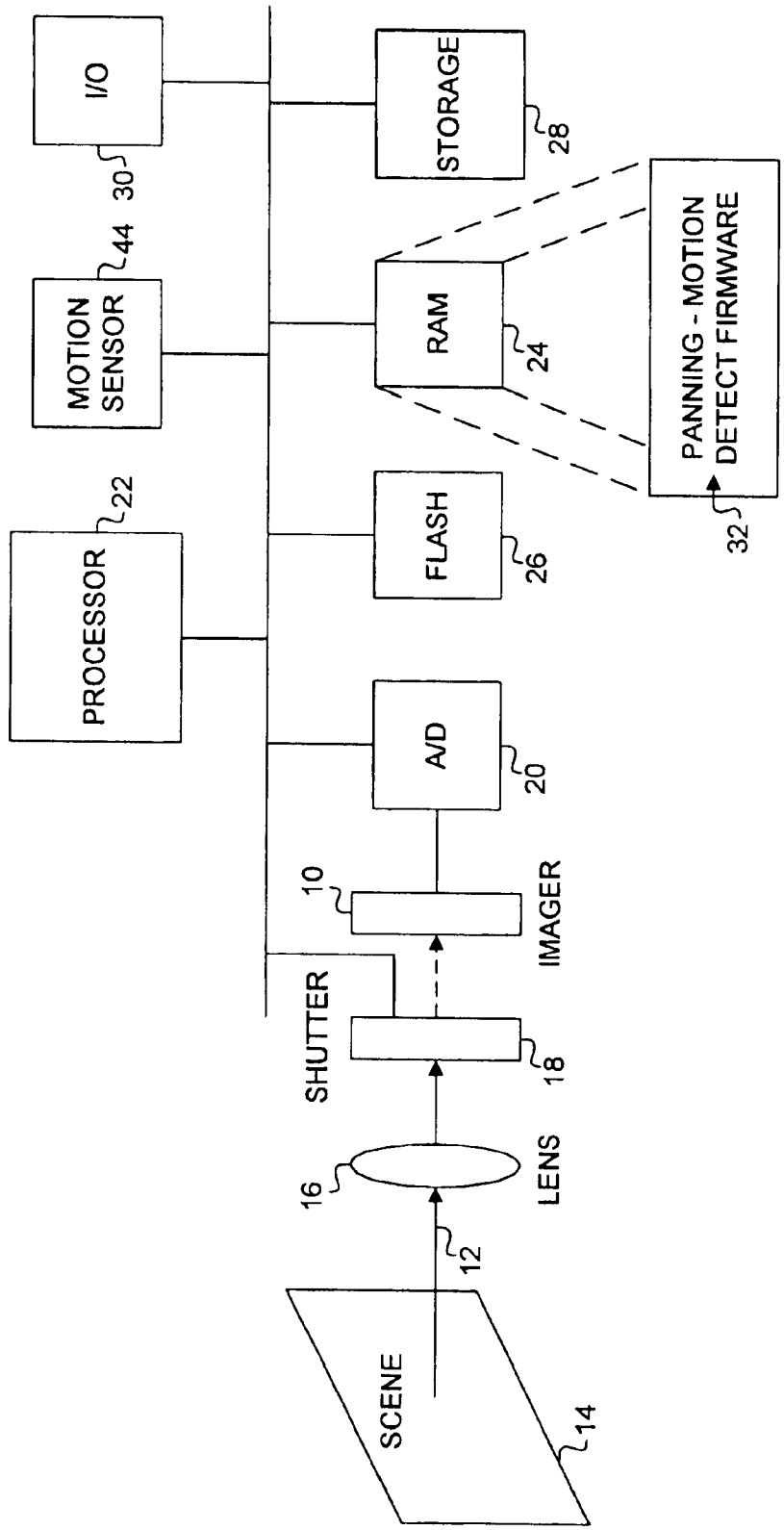
FIG. 3 is a block diagram illustrating a camera M according to a third embodiment.

Now referring to FIG. 3, there is illustrated a camera M according to a third embodiment of the present invention. It is noted that the components repeated from FIG. 1 are substantially identical and no further explanation is needed except as provided below.

This embodiment relates to a digital or film-based (not illustrated) camera M having an auxiliary navigation sensor 44. The navigation sensor 44 tracks movement of the camera as it is panned across the scene 14. In one embodiment, the navigation sensor 44 is an image sensor and processing device having an array of photosensitive elements to track movement of the scene as the camera M is panned. The image sensor and processing device performs a series of nearest neighbor cross-correlations between a previously stored image and a most recently acquired image to determine relative displacement. Since this embodiment uses light reflected from scene 14, it will have an independent optical path as compared to the main light path (as shown in FIG. 1). An example of such a device is the HDNS-2000 optical mouse sensor manufactured by Agilent Technologies. Further details of the image sensor and processing device are disclosed in U.S. Pat. No. 5,644,139, entitled "Navigation Technique For Detecting Movement of Navigation Sensors Relative To An Object," hereby incorporated by reference.

In another embodiment, the navigation sensor 44 is a gyroscope for tracking movement of the camera M (with respect to an image). An example of such a gyroscope includes a Microgyro by Gyration. Other embodiments of the navigation sensor 44 include a compass and other forms of motion sensing devices.

Because the navigation sensor 44 operates independently from the camera's main light path (lens 16, shutter 18, imager 10), in camera M the angular displacement of the camera required for optimal image overlap during the pan will depend on the angle of view of the lens 16. A wide-angle lens (short-focal-length) will require more angular displacement than a normal (normal focal length, i.e., 50mm lens) or telephoto lens (long-focal-length). A telephoto lens will require less angular displacement than a normal of wide-angle lens. Thus, it takes fewer images to make a composite panoramic image with a wide-angle lens and it takes more images with a telephoto. Therefore, the focal-length of the lens is another factor of consequence when computing displacements with the navigation sensor 44.

Thus, as shown in FIGS. 1–3, there are a number of embodiments available for tracking image movement for purposes of computing an overlap value between a previous and current frame.

Preferably, each frame in a pan should overlap an adjacent frame by a minimum predetermined overlap of image area, such as 10%, so that the stitching software can perform its job. This minimum predetermined overlap is determined mainly by the image stitching software, but includes factors such as pan sweep rates, frame rates, lighting, contrast and resolution. Preferably, frames are acquired fullframe at a rate of at least 15 frames/second, but lower frame-rates and frame samplings may be used with slightly slower panning rates. For example, a slow frame rate may require the minimum predetermined overlap to be increased (e.g., 15% overlap). On the other hand, a higher frame rate may allow the minimum predetermined overlap to be decreased (e.g., 5%).

Of course, images overlapping by larger amounts than the minimum are satisfactory for purposes of stitching the images together, but are undesirable for purposes of minimizing storage requirements in the case of digital cameras. For this reason, a maximum predetermined overlap, such as 25%, is empirically determined to maximize storage utilization and minimize the number of frames captured to produce a given panoramic. Therefore to optimize frame capture, a predetermined overlap range is defined as an overlap percentage between the minimum and maximum predetermined overlaps, such as 10–25%. This range is configurable and can be adjusted according to specific needs.

Figure 4:
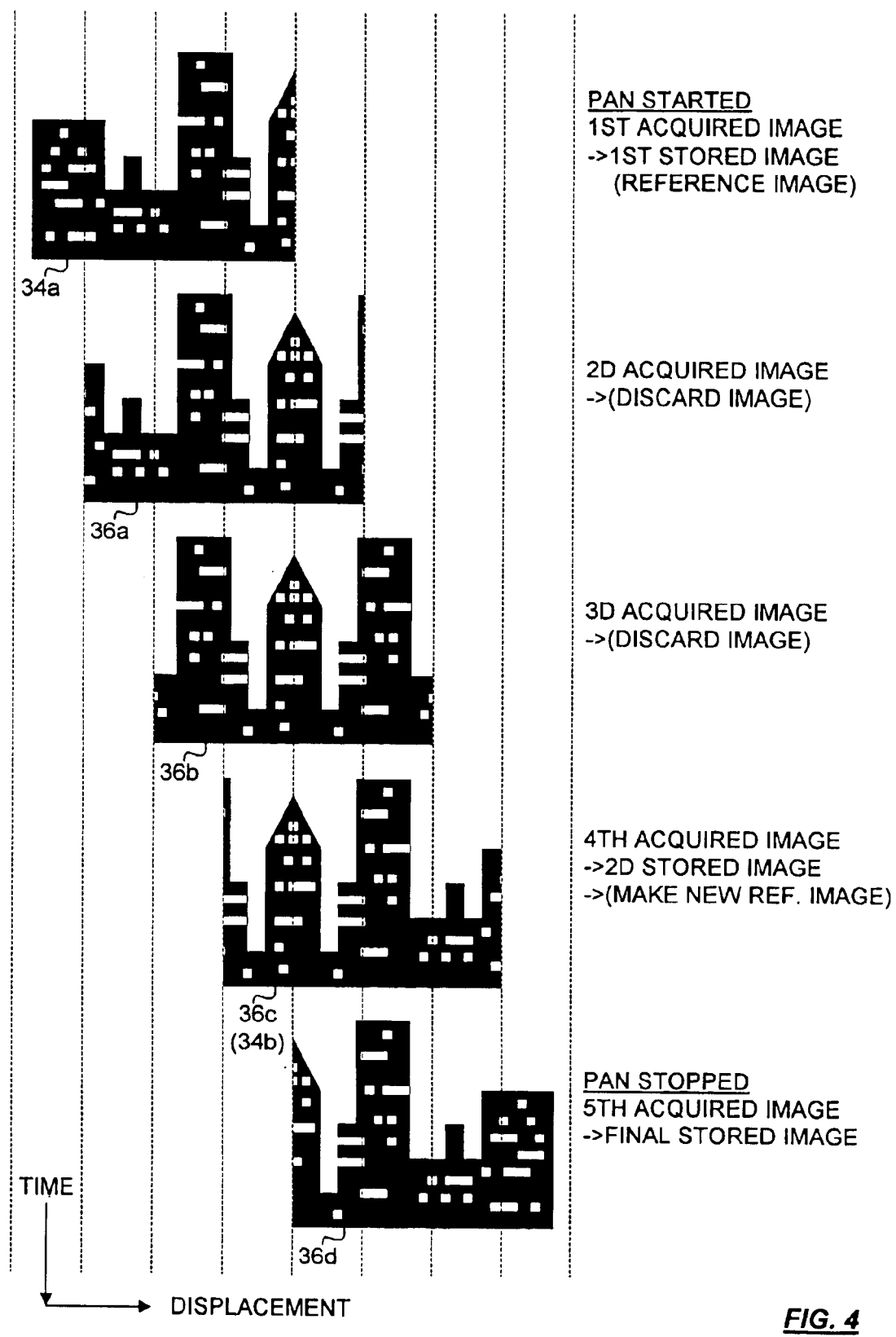
FIG. 4 is a timeline illustrating a sequence of frames acquired during a pan.

Now referring to FIG. 4, there is illustrated a timeline of frames acquired during a pan to demonstrate the overlapping of images. As the camera is panned across a scene, a current frame is compared to a previously captured frame. If the current frame overlaps the previously captured frame by a percentage prescribed by the predetermined overlap range, the current frame is captured.

The illustration is described using the embodiment of camera C with a simple rightward panning modon. At the beginning of the pan a left-most portion of the scene is captured in a first captured image known as reference image 34a. As the camera C is panned in a given direction, the processor 22 repeatedly acquires different portions of the scene (e.g., frames 36a, 36b and 36c) and compares it against the reference image 34a to determine an amount of overlap. As shown with respect to frames 36a, 36b and 36c, if the computed overlap does not fall within the predetermined overlap range, the recently acquired frame is discarded and the process is repeated.

If the overlap falls within the predetermined overlap range, the recently acquired scene portion (e.g., frame 36c) is captured as another sequence in the panoramic or wide-area image. The captured frame is then designated as the reference image 34 and the process is repeated to capture the next frame. A final portion of the scene is captured in a final frame when the pan is stopped.

The process is similar for camera F except that the frames are captured on film instead of persistent memory. Likewise, the process is similar using the embodiments 15 of motion sensor 44. Position information read from motion sensor 44 is converted into an overlap value which determines whether a scene portion is within the predetenmined overlap range.

Figure 5A:
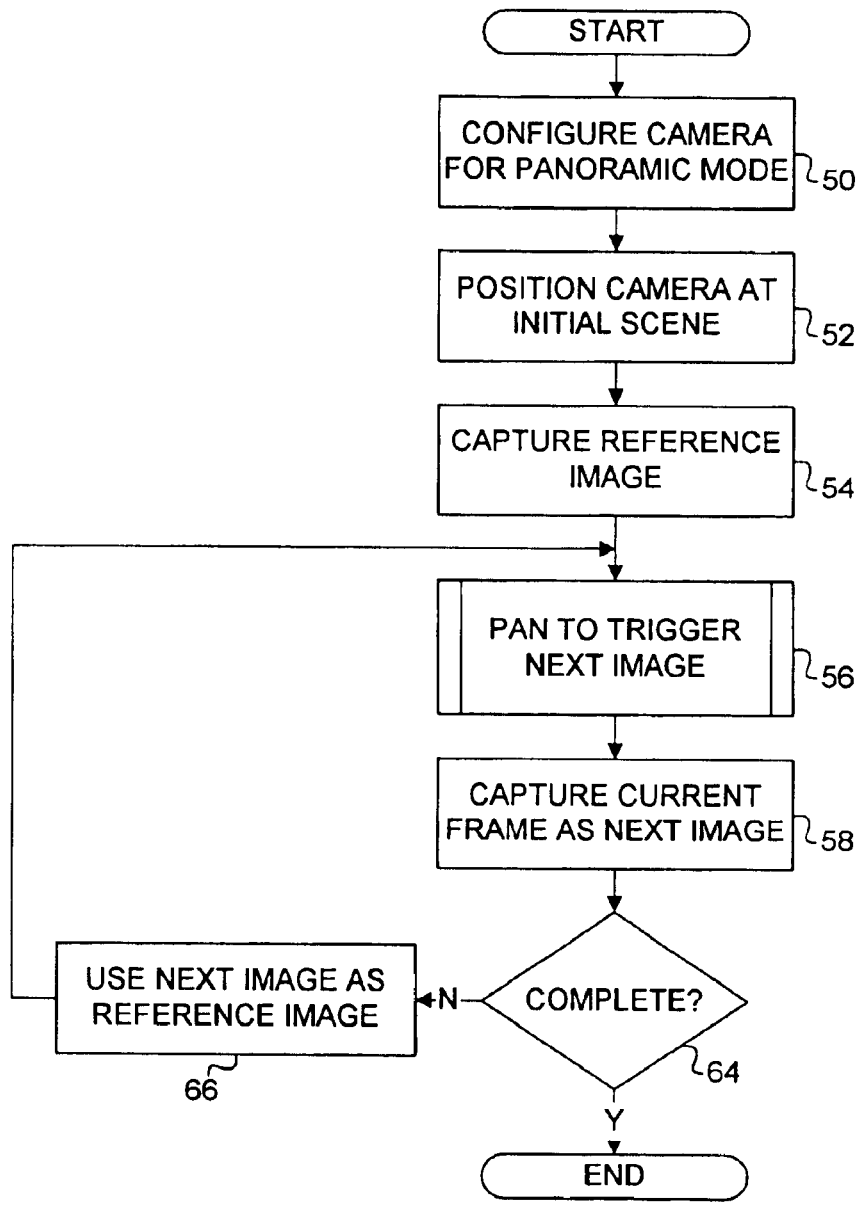
FIG. 5A is a flow diagram illustrating operations performed by camera C when executing panning firmware, according to the preferred embodiment.

Now turning to FIG. 5A, there is illustrated a flow diagram of the panning operation performed by the cameras of FIGS. 1–3 when executing the panning firmware 32 according to a first embodiment. The panning operation starts at step 50 with a camera operator configuring the camera for panoramic mode. From the operator's point of view, panoramic mode differs from the normal operating mode in that the camera should not be held still, but instead, should be physically panned across an image. A rotating tripod may be used, but is not necessary or even preferred. At a step 52, the camera is positioned at one end of a desired panoramic or wide-angle image. For a panoramic image, the camera is preferably panned in a single direction (e.g., rightward or leftward). For a wide-angle or wide-area image, the camera may be panned in a serpentine direction (e.g., up and down moving. rightward; or up and down moving leftward).

At step 54, the pan is initiated when the camera operator activates an electro-mechanical exposure button to capture the first exposure. There are a number of different ways the exposure button can be used to trigger exposures. In a first approach, the panning operation is started with a first actuation and stopped with a second actuation. In a second approach, the panning operation is started. and continued as long as the button is depressed. In a third approach, the panning operation is started with a first actuation, each frame is manually captured in response to an audio/visual indication (separately or combined) from the camera with subsequent actuations, and the panning operation is terminated if the button is actuated while no audio/visual indication is given. In any event, activation of the exposure button causes a first exposure to be captured and stored in storage 28. The first exposure is designated as the reference image 34.

Figure 6A:
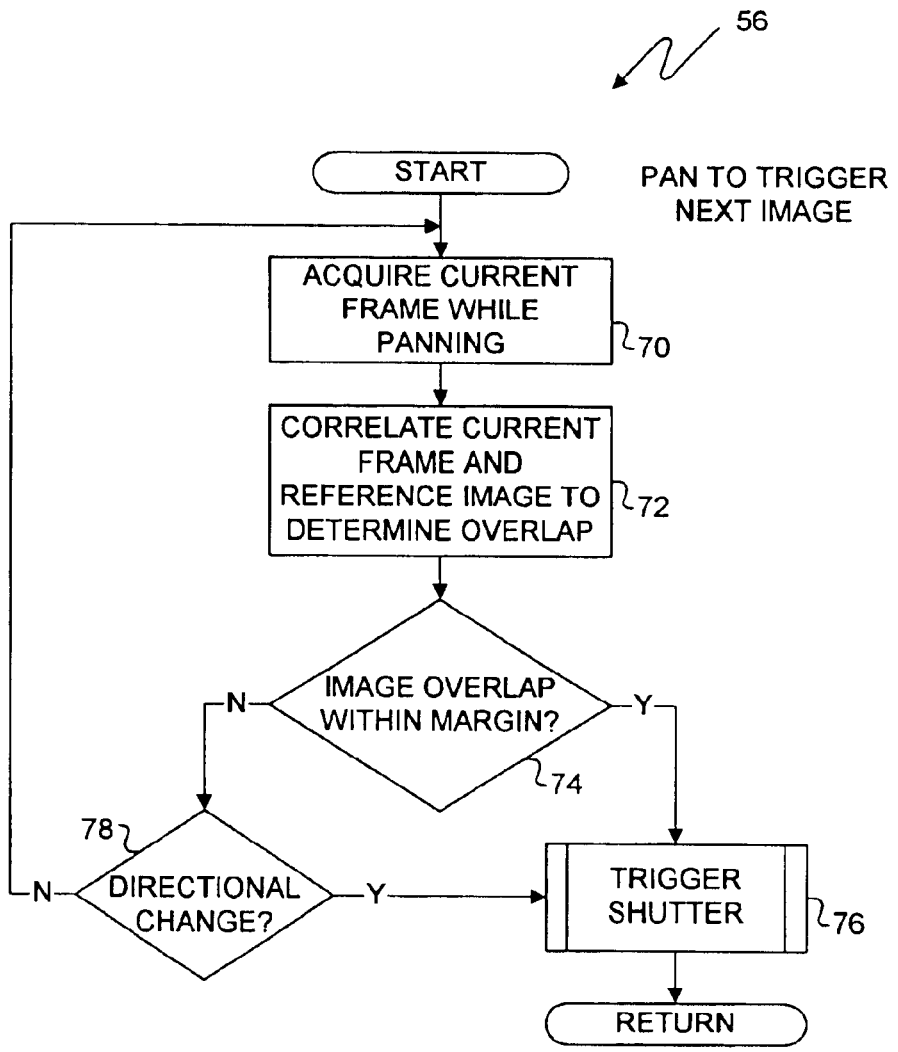
FIGS. 6A–B are flow diagrams illustrating different methods of triggering exposures during a pan across a scene.
Figure 6B:
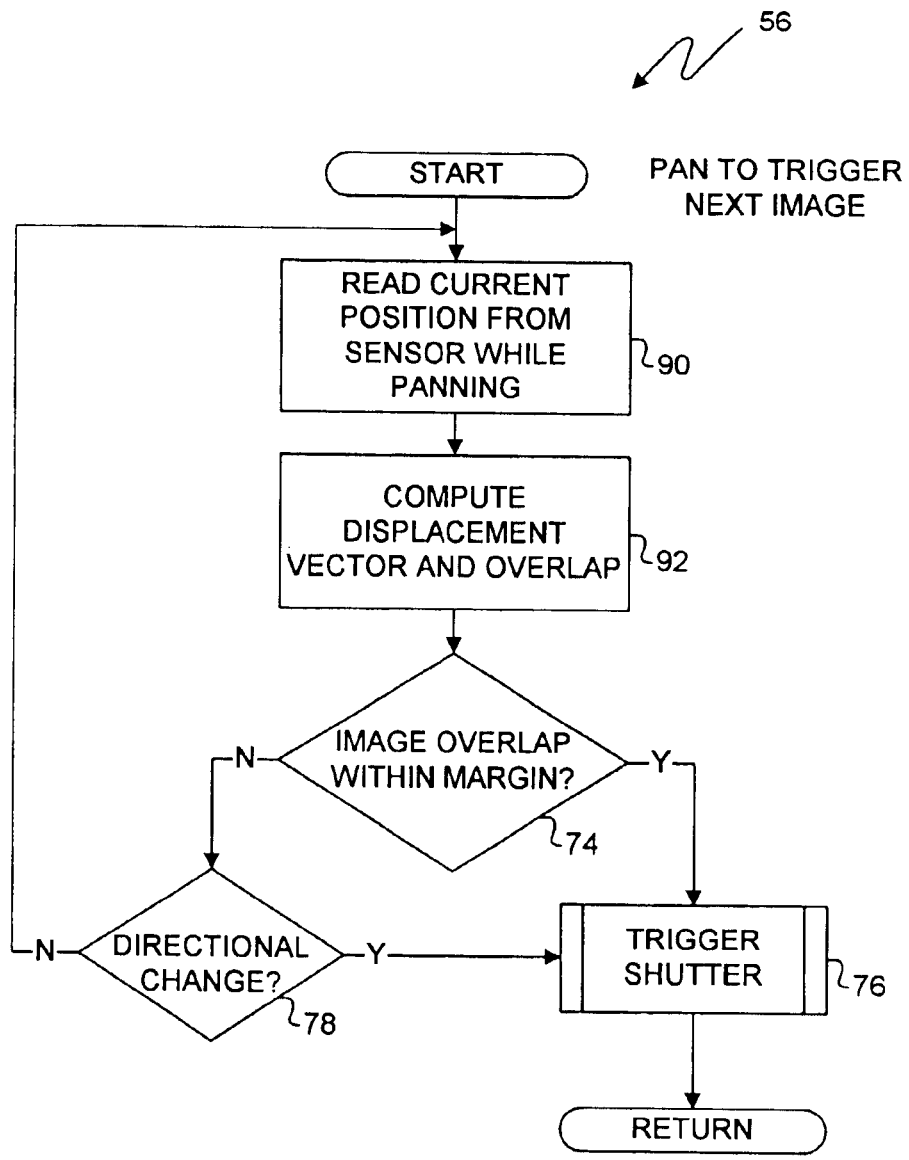

Step 56 is executed while the camera is panned across the scene 14 to determine when a next acquired image should be captured. FIG. 6A illustrates a method of automatically triggering one or more exposures during a pan across a scene according to camera C. FIG. 6B illustrates a method according to cameras F and M. Both methods are operable with the digital camera C and M of FIGS. 1 and 3, or the film-based camera F and M of FIGS. 2 and 3. When step 56 triggers the shutter 18, the procedure advances to step 58 where a next image in the panoramic image is captured and stored in storage 28.

At step 64, the camera determines whether the panning operation is complete. There are several ways in which the panning operation may be concluded: by actuation of the electro-mechanical exposure button; when a predetermined number of images has been captured; when storage capacity of the camera has been exhausted; or when the camera has substantially stopped panning for a sufficient time, such as 5 seconds. If one of the above-identified conclusion events occurs, the panoramic image capture procedure completes. If one of the above-identified events has not occurred, the procedure branches to step 66 where the next captured image from step 58 is designated as the reference image 34. The procedure loops back from step 66 to step 56 to capture a next image in the sequence. The procedure loops through steps 56–66 to capture subsequent images in the panoramic series until one of the above-identified completion events occurs.

After the operation is completed, the camera may transmit the sequence of images to the computer system S for stitching into a single panoramic image.

Figure 5B:
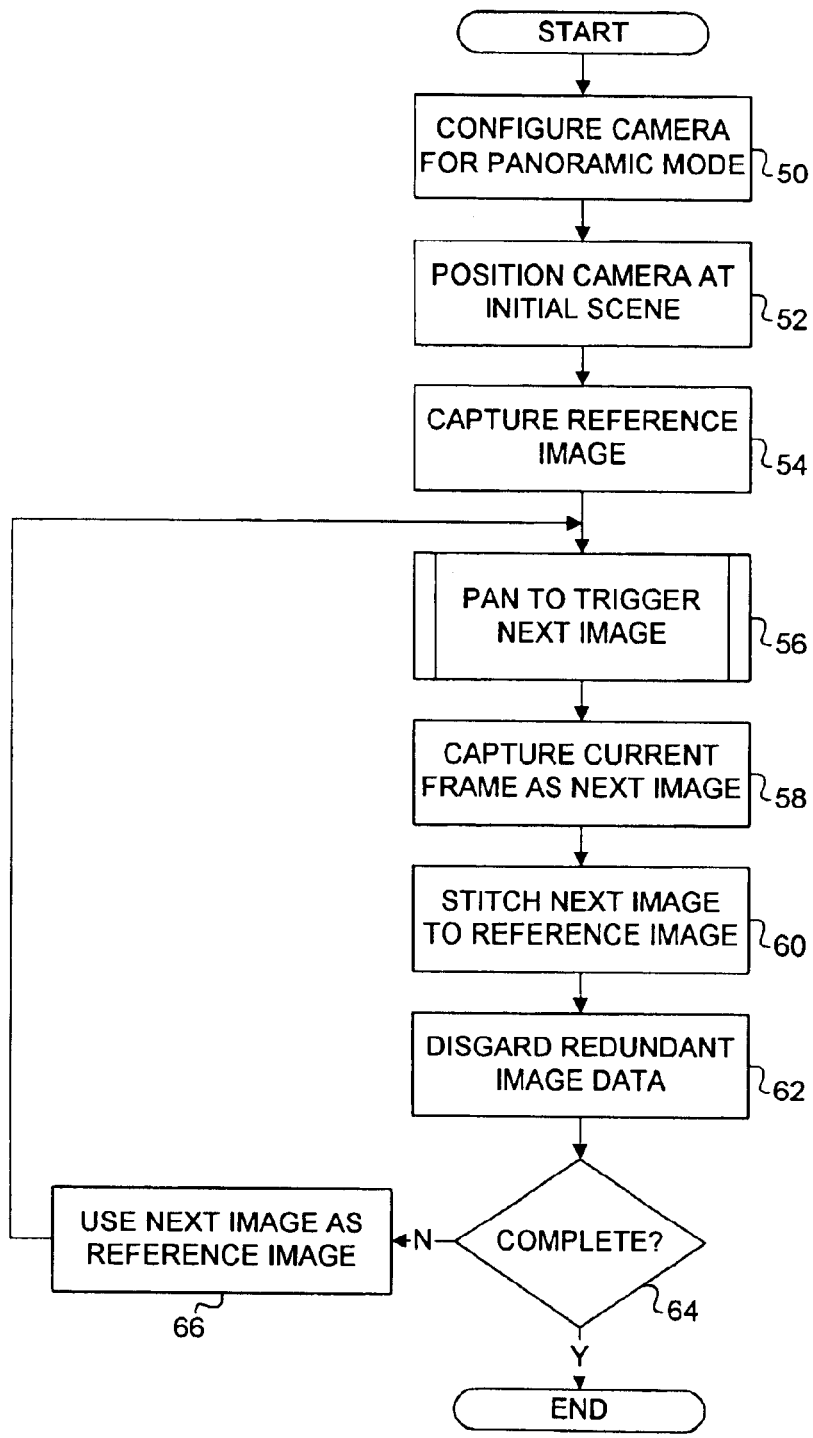
FIG. 5B is a flow diagram illustrating operations performed by camera C when executing panning firmware, according to an alternative embodiment.

Referring now to FIG. 5B, there is illustrated a flow diagram of the panning operation performed by the cameras of FIGS. 1–3 when executing the panning firmware 32 according to a second embodiment. The operation illustrated in FIG. 5B is substantially similar to the operation of FIG. 5A except that this operation includes a stitching algorithm (step 60) on-board the camera (i.e., camera C or M) to stitch together the captured images. Therefore, in this embodiment, the camera provides a single panoramic image instead of a sequence of conventionally sized images. Because individual images are stitched together into a single image, at step 62 the overlap may be discarded to recover storage capacity.

Now turning to FIG. 6A, there is illustrated in more detail the method of step 56 for automatically triggering an exposure during a pan across a scene, according to camera C. The sub-procedure begins at a step 70 where a current image 36 is acquired by transferring data from the imager 10 to memory 24. At step 72, the processor 22 compares the current image 36 to the reference image 34 to determine position and orientation information between the two images. The comparison is performed using an image correlation routine. An example of a suitable image correlation routine is described in U.S. Pat. No. 5,644,139 entitled "Navigation Technique For Detecting Movement of Navigation Sensors Relative To An Object," hereby incorporated by reference. The position information is converted into an overlap value indicating the amount of overlap between the two images.

At step 74, the processor determines whether the computed overlap value is within the predetermined overlap range. If the value is within the range, a trigger actuation method 76 is called. Once the trigger actuation method 76 is complete, the sub-procedure returns to the calling program at step 56 to capture of the current image. It is noted that if this sub-procedure were performed on a film-based camera, method 76 would cause the conventional shutter to be triggered. If the value is not within range, the sub-procedure branches to step 78.

At step 78, the processor 22 determines whether the panning direction has changed. If the panning direction has changed and certain criteria is satisfied, the subprocedure advances to step 76 to call the trigger actuation method. Otherwise, the sub-procedure returns to step 70. There are a number of situations where a change in panning direction will trigger a next image. These situations can best be explained with reference to FIGS. 8A–B.

Figure 8A:
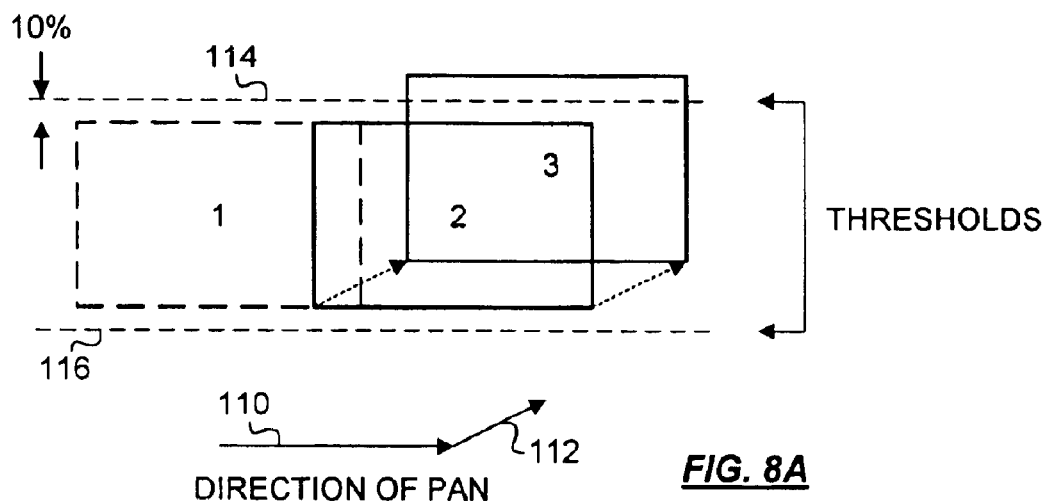
FIG. 8 is a conceptual view of a paths taken during a panning operation.

FIG. 8A shows a panning path 110 in which two frames (e.g., frames 1 and 2) were captured and a diverging path 112 in which a third frame lies. A change in direction not parallel to the established path will trigger an exposure if a predetermined parallel threshold is exceeded. For example, the predetermined parallel threshold could be 10% of the height of a previous frame. An upper predetermined parallel threshold 114 and a lower predetermined parallel threshold 116 define a band of expected movement along the path 110. The values are chosen so that normal diverging motions caused by the camera operator while panning along the path will not be interpreted as a change in direction. However, when a change in direction is sufficient to exceed one of the predetermined thresholds, an exposure is triggered. This technique is useful for capturing boundary frames.

Figure 8B:
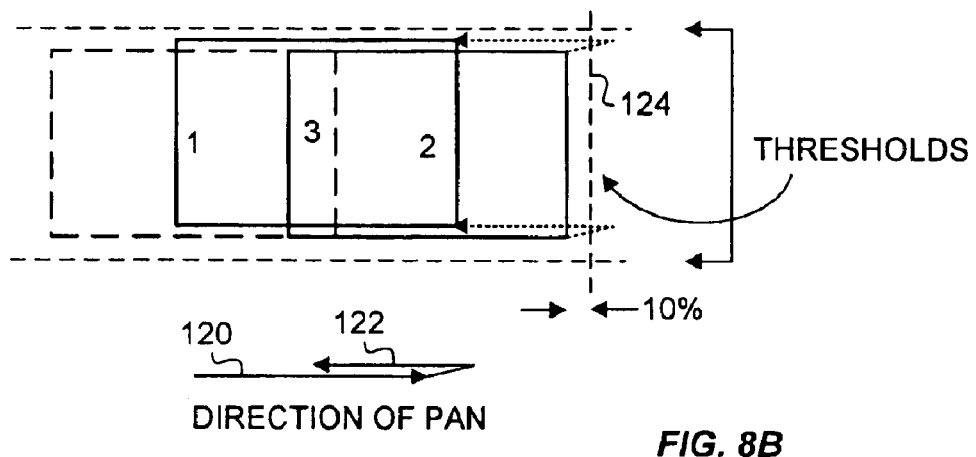

FIG. 8B shows a panning path 120 in which two frames (e.g., frames 1 and 2) were captured and a diverging path 122 in which a third frame lies. In this example, the direction is reversed so that the panning direction causes the camera to retrace a previously captured scene area. Previously captured scene portions will be be captured a second time. However, if the path moves forward enough to pass a predetermined perpendicular threshold 124, a direction reversal will cause a trigger. For example, the predetermined perpendicular threshold 124 could be 10% of the width of a previous frame. As shown, since the frame was panned rightward beyond the predetermined perpendicular threshold 124 before reversing direction, an exposure is triggered.

FIG. 6B illustrates in more detail the method of step 56 for automatically triggering an exposure during a pan across a scene, based on the motion sensor 44 of cameras F and M. Each of the different embodiments of the motion sensor 44 are operable to provide positioning information between two points of reference (e.g., frames) which is mathematically convertible into an overlap value.

At a step 90, the processor 22 reads a current position value from the motion sensor 44 while the camera is panned. Next at step 92, the processor 22 computes direction and overlap values for the current frame 36 as compared to the reference image 34. The implementation of these steps is dependent upon the inherent workings of the motion sensor 44. For example, the image sensor embodiment of the motion sensor 44 may provide incremental movement or positional data while the gyroscope may provide motion data. In any event, a direction and overlap value is readily computable based on well-known conversion techniques.

The remaining steps 74–78 are similar to those described in FIG. 6A.

Figure 7:
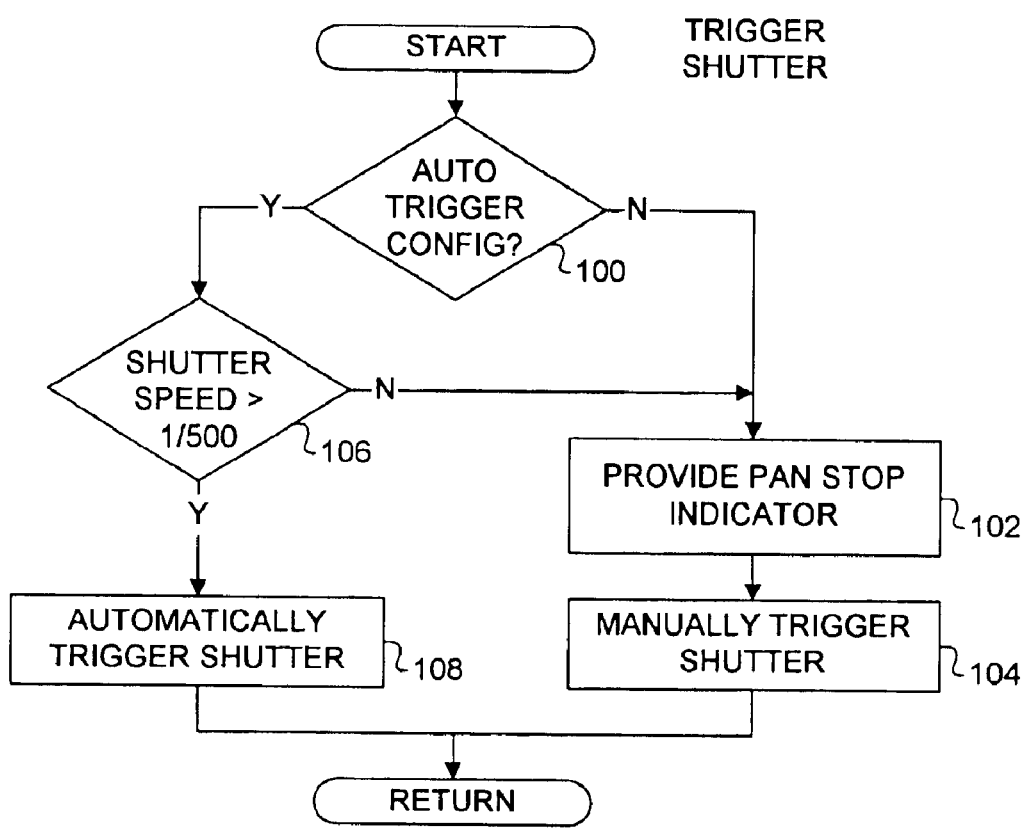
FIG. 7 is a flow diagram illustrating further details of the triggering method of FIGS. 6A–B.

Referring now to FIG. 7, there is illustrated a flow diagram of method 76. These series of steps are applicable to cameras C, M, and F. At a step 100, it is determined whether the camera is operating in an automatic or manual mode. Automatic mode is appropriate for exposure settings that result in a sufficiently fast shutter speed so that the panning movement does not cause blurring of the image. Nighttime settings may not be appropriate for automatic mode. In such circumstances, a manual mode may be used. If automatic mode is not enabled (i.e., manual mode is enabled), a panning stop indicator is provided to indicate to the camera operation to stop panning. A visual or audible indication may be provided. Once the operator stops panning, the shutter is triggered by the operator at step 104 to capture the image. From step 104, the method returns to the calling routine.

If at step 100 it is determined that the camera is configured for automatic mode, the method branches to step 106.where a sufficiently fast shutter speed, such as $\frac{1}{500}^{th}$ second, is verified. If the shutter is fast enough, the shutter is automatically triggered at step 108 to capture the image. Otherwise, if the shutter is not fast enough due to inadequate lighting or other factors, the method branches to step 102 to manually capture the image. From step 108, the method returns to the calling routine.

Therefore, it can be seen from the foregoing that the invention provides a method and apparatus for automatically capturing a plurality of images during a pan to create a panoramic image. Although several embodiments of the invention have been described and illustrated, the invention is not to be limited to the specific forms or arrangements of the parts so described and illustrated. Thus, having illustrated and described the principles of the invention in a preferred embodiment, it should be apparent to those of ordinary skill in the art that the invention can be modified in arrangement and detail without departing from such principles.

What is claimed is:

1. A method for automatically triggering frames with a camera during a pan across a scene, the camera comprising a shutter having a shutter speed associated therewith, the method comprising:

moving the camera across the scene; and capturing a plurality of scene portions, each scene portion being captured based on a predetermined movement threshold;

wherein the scene portions are captured without stopping the movement of the camera if the shutter speed exceeds a predetermined shutter speed threshold; and wherein the scene portions are captured after stopping the movement of the camera if the shutter speed does not exceed the predetermined shutter speed threshold.

2. The method of claim 1, wherein the predetermined movement threshold comprises an overlap range.

3. The method of claim 1, wherein the predetermined movement threshold comprises a change in direction.

4. The method of claim 1, further comprising:

measuring movement with respect to a given position; and capturing a scene portion at a next position when the movement has exceeded a predetermined movement threshold.

5. The method of claim 4, wherein the measuring step further comprises:

periodically capturing current frames during the pan; and comparing each current frame to a previously captured frame to determine if the movement has exceeded the predetermined movement threshold.

6. The method of claim 5, wherein the comparing step uses a correlation alogirthm to determine if the movement has exceeded the predetermined movement threshold.

7. The method of claim 4, wherein the measuring step comprises reading positional information from a motion sensor fixed to the camera.

8. The method of claim 1, further comprising:

providing an audio/visual indication to prompt a camera operator to stop the pan and manually capture the scene portion if the shutter speed is lower then the predetermined shutter speed threshold.

9. The method of claim 1, further comprising:

stitching together the plurality of scene portions to create a panoramic image.

10. The method of claim 1, and further comprising calculating the shutter speed.

11. A camera for capturing a plurality of images during a pan of a scene, comprising:

an imager comprising a shutter having a shutter speed associated therewith; and a processor coupled to the imager, the processor configured to capture a plurality of scene portions with the imager, the processor and the imager combining to measure movement, and each scene portion being captured based on a predetermined movement threshold;

wherein the processor causes the scene portions to be captured without stopping movement of the camera if the shutter speed exceeds a predetermined shutter speed threshold; and wherein the processor causes the scene portions to be captured after stopping movement of the camera if the shutter speed does not exceed the predetermined shutter speed threshold.

12. The camera of claim 11, wherein the predetermined movement threshold comprises an overlap range.

13. The camera of claim 11, wherein the predetermined movement threshold comprises a change of direction.

14. The camera of claim 11, wherein the processor is further configured to:

measure movement with respect to a given position; and capture a scene portion at a next position when the movement has exceeded a predetermined movement threshold.

15. The camera of claim 14, wherein the processor further configured to:

periodically capture current frames during the pan; and compare each current frame to a previously captured frame to determine if the movement has exceeded the predetermined movement threshold.

16. The camera of claim 15, wherein the processor uses a correlation algorithm to determine if the movement has exceeded the predetermined movement threshold.

17. The camera of claim 14, wherein the processor reads positional information from a motion sensor fixed to the camera to measure movement.

18. The camera of claim 11, wherein the processor is further configured to:

provide an audio/visual indication to prompt a camera operator to stop the pan and manually capture the scene portion if the shutter speed is lower than a predetermined shutter speed threshold.

19. The camera of claim 11, wherein the processor is further configured to:

stitch together the plurality of scene portions to create a panoramic image.

20. A camera for capturing a plurality of images during a pan of a scene, comprising:

a shutter having a shutter speed associated therewith;

a motion sensor; and a processor, the processor coupled to the motion sensor, the processor configured to capture a plurality of scene portions, each scene portion being captured based on a predetermined movement threshold as measured by the motion sensor, the process being further configured to cause scene portions to be captured without stopping the movement of the camera if the shutter speed exceeds a predetermined shutter speed threshold, and to cause portions to be captured after stopping movement of the camera if the shutter speed does not exceed the predetermined shutter speed threshold.

21. The camera of claim 20, wherein the predetermined movement threshold comprises an overlap range.

22. The camera of claim 20, wherein the predetermined movement threshold comprises a change in direction.

23. The camera of claim 20, wherein the processor is further configured to:

measure movement with respect to a given position; and capture a scene portion at a next position when the movement has exceeded a predetermined movement threshold.

24. The camera of claim 23, wherein the processor is further configured to:

periodically capture current frames during the pan; and compare each current frame to a previously captured frame to determine if the movement has exceeded the predetermined movement threshold.

25. The camera of claim 24, wherein the processor uses a correlation algorithm to determine if the movement has exceeded the predetermined movement threshold.

26. The camera of claim 20, wherein the processor is further configured to:

provide an audio/visual indication to prompt a camera operator to stop the pan and manually capture the scene portion if the shutter speed is lower than the predetermined shutter speed threshold.

27. The camera of claim 20, wherein the processor is further configured to:

stitch together the plurality of scene portions to create a panoramic image.

28. The camera of claim 20, wherein the motion sensor comprises a gyroscope.

29. The camera of claim 20, wherein the motion sensor comprises a compass.

30. The camera of claim 20, wherein the motion sensor includes an image sensor.

31. The camera of claim 20, wherein the processor is further configured to calculate the shutter speed.

* * * * *

UNITED STATES PATENT AND TRADEMARK OFFICE
CERTIFICATE OF CORRECTION

PATENT NO. : 6,930,703 B1
APPLICATION NO. : 09/562597
DATED : August 16, 2005
INVENTOR(S) : Paul M. Hubel et al.

It is certified that error appears in the above-identified patent and that said Letters Patent is hereby corrected as shown below:

In column 1, line 21, delete "or" and insert -- of --, therefor.

In column 7, line 8, delete "modon" and insert -- motion --, therefor.

In column 7, line 29, after "embodiments" delete "15".

In column 10, line 36, in Claim 1, after "across" delete "the" and insert -- a --, therefor.

In column 10, line 63, in Claim 6, delete "alogirthm" and insert -- algorithm --, therefor.

In column 11, line 4, in Claim 8, delete "then" and insert -- than --, therefor.

In column 11, line 34, in Claim 13, delete "of" and insert -- in --, therefor.

In column 11, line 41, in Claim 15, after "processor" insert -- is --.

Signed and Sealed this

First Day of September, 2009

David J. Kappos
*Director of the United States Patent and Trademark Office*